(12) United States Patent
Kishine

(10) Patent No.: US 10,571,776 B2
(45) Date of Patent: Feb. 25, 2020

(54) DOME COVER FOR CAMERA AND CAMERA WITH COVER

(71) Applicant: FUJIFILM Corporation, Tokyo (JP)

(72) Inventor: Yasunobu Kishine, Saitama (JP)

(73) Assignee: FUJIFILM Corporation, Tokyo (JP)

(*) Notice: Subject to any disclaimer, the term of this patent is extended or adjusted under 35 U.S.C. 154(b) by 217 days.

(21) Appl. No.: 15/694,473

(22) Filed: Sep. 1, 2017

(65) Prior Publication Data

US 2018/0024416 A1    Jan. 25, 2018

Related U.S. Application Data

(63) Continuation of application No. PCT/JP2015/083964, filed on Dec. 3, 2015.

(30) Foreign Application Priority Data

Mar. 31, 2015    (JP) .................................. 2015-072937

(51) Int. Cl.
*G03B 11/04*    (2006.01)
*G03B 17/02*    (2006.01)
(Continued)

(52) U.S. Cl.
CPC .............. *G03B 11/04* (2013.01); *G02B 13/06* (2013.01); *G02B 27/0025* (2013.01);
(Continued)

(58) Field of Classification Search
None
See application file for complete search history.

(56) References Cited

U.S. PATENT DOCUMENTS 7,530,699 B2 * 5/2009 Shulepova ............... G02B 3/00
359/599
2007/0167834 A1   7/2007 Pascal et al.
(Continued)

FOREIGN PATENT DOCUMENTS

CN     101526654 A    9/2009
CN     201413559 Y    2/2010
(Continued)

OTHER PUBLICATIONS

International Preliminary Report on Patentability (Form PCT/IPEA/409) for International Application No. PCT/JP2015/083964, dated Dec. 1, 2016, with an English translation.
(Continued)

*Primary Examiner* — Derek S. Chapel
(74) *Attorney, Agent, or Firm* — Birch, Stewart, Kolasch & Birch, LLP

(57) ABSTRACT

The invention provides a dome cover for a camera and a camera with a cover that can effectively acquire an image in which a visually-recognizable range is wide and blurring is suppressed and that are durable. In one aspect of the invention, a dome cover (10) for a camera includes a curved section (11) of which a front surface and a back surface have a spherical shape; a skirt section (12) of which a front surface and a back surface have a cylinder shape; and a light-shielding part (15) that shields a part or whole of at least one of light that is incident from the skirt section (12) and is emitted from the curved section (11) or light that is incident from the curved section (11) and is emitted from the skirt section (12). The curved section (11) and the skirt section (12) are integrally molded.

12 Claims, 16 Drawing Sheets

(51) Int. Cl.
  *G03B 17/56* (2006.01)
  *G02B 27/00* (2006.01)
  *G02B 5/00* (2006.01)
  *H04N 5/225* (2006.01)
  *G02B 13/06* (2006.01)

(52) U.S. Cl.
  CPC ............ *G03B 17/02* (2013.01); *G03B 17/56* (2013.01); *H04N 5/225* (2013.01); *H04N 5/2252* (2013.01); *G02B 5/003* (2013.01)

(56) References Cited

U.S. PATENT DOCUMENTS

| | | | |
|---|---|---|---|
| 2009/0225157 A1 | 9/2009 | Orihara et al. | |
| 2011/0096164 A1 | 4/2011 | Mori et al. | |
| 2012/0169870 A1* | 7/2012 | Jain | G02B 27/0025 348/143 |
| 2012/0243861 A1 | 9/2012 | Svensson et al. | |
| 2013/0223834 A1 | 8/2013 | Jikihara et al. | |
| 2013/0265506 A1* | 10/2013 | Nishimura | G02B 5/0242 349/12 |
| 2015/0277000 A1* | 10/2015 | Lee | G02B 5/208 359/356 |
| 2016/0205299 A1 | 7/2016 | Imaoka | |

FOREIGN PATENT DOCUMENTS

| | | |
|---|---|---|
| CN | 102037402 A | 4/2011 |
| CN | 202068484 U | 12/2011 |
| CN | 102694970 A | 9/2012 |
| CN | 203275849 U | 11/2013 |
| CN | 203851197 U | 9/2014 |
| EP | 1803387 A2 | 7/2007 |
| JP | 60-49432 U | 4/1985 |
| JP | 2000-122056 A | 4/2000 |
| JP | 2001-249228 A | 9/2001 |
| JP | 2006-121522 A | 5/2006 |
| JP | 2007-181700 A | 7/2007 |
| JP | 2008-33220 A | 2/2008 |
| JP | 2012-205307 A | 10/2012 |
| JP | 2014-44429 A | 3/2014 |
| WO | WO 2012/063482 A1 | 5/2012 |
| WO | WO 2015/129230 A1 | 9/2015 |

OTHER PUBLICATIONS

International Search Report and Written Opinion of the International Searching Authority (Forms PCT/ISA/210 and PCT/ISA/237) for International Application No. PCT/JP2015/083964, dated Mar. 8, 2016, with English translations.

Chinese Office Action and Search Report dated Mar. 25, 2019, for Counterpart Chinese Application No. 201580077658.5, with English translation.

* cited by examiner

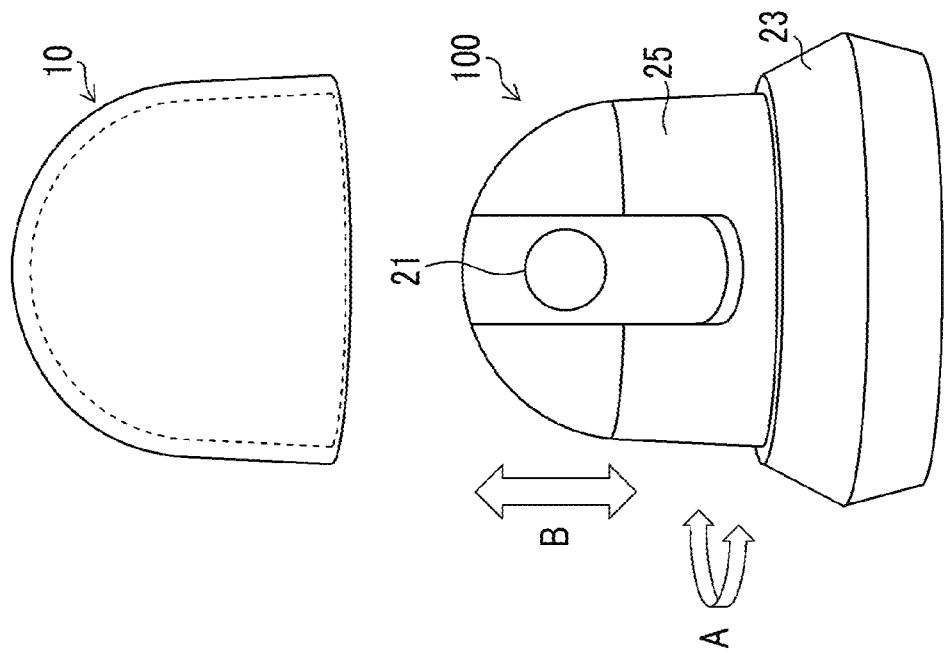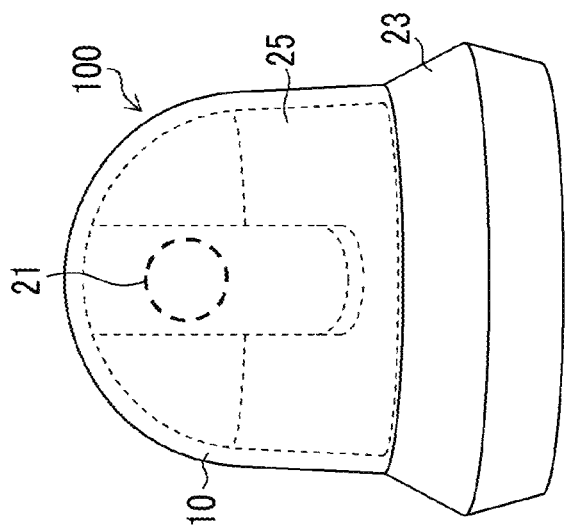

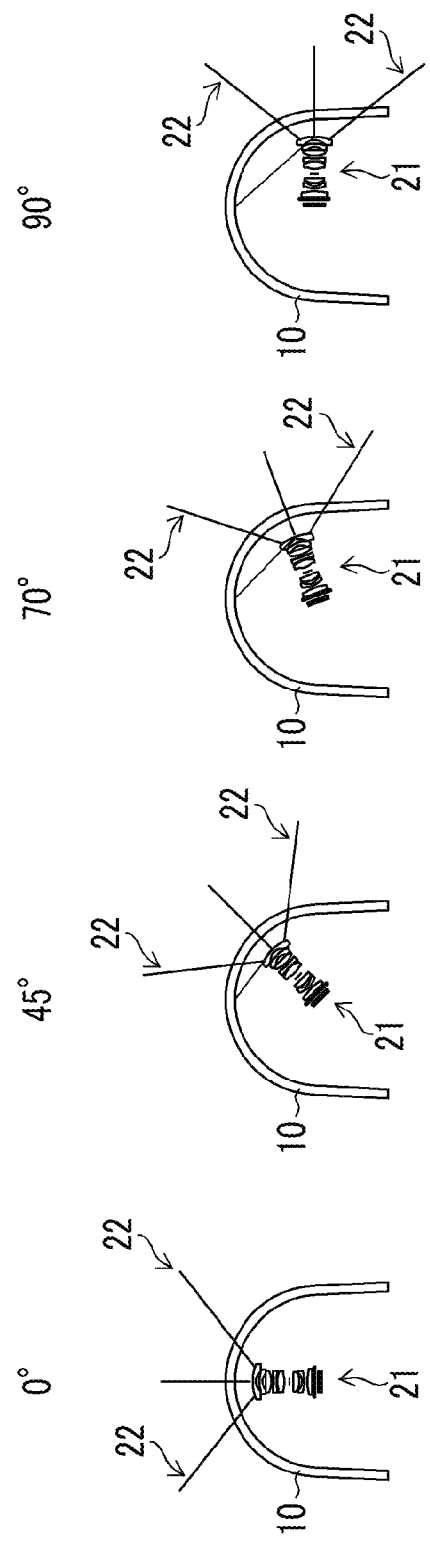

(a)  (b)  (c)  (d)  (e)

(a)  (b)  (c)  (d)  (e)

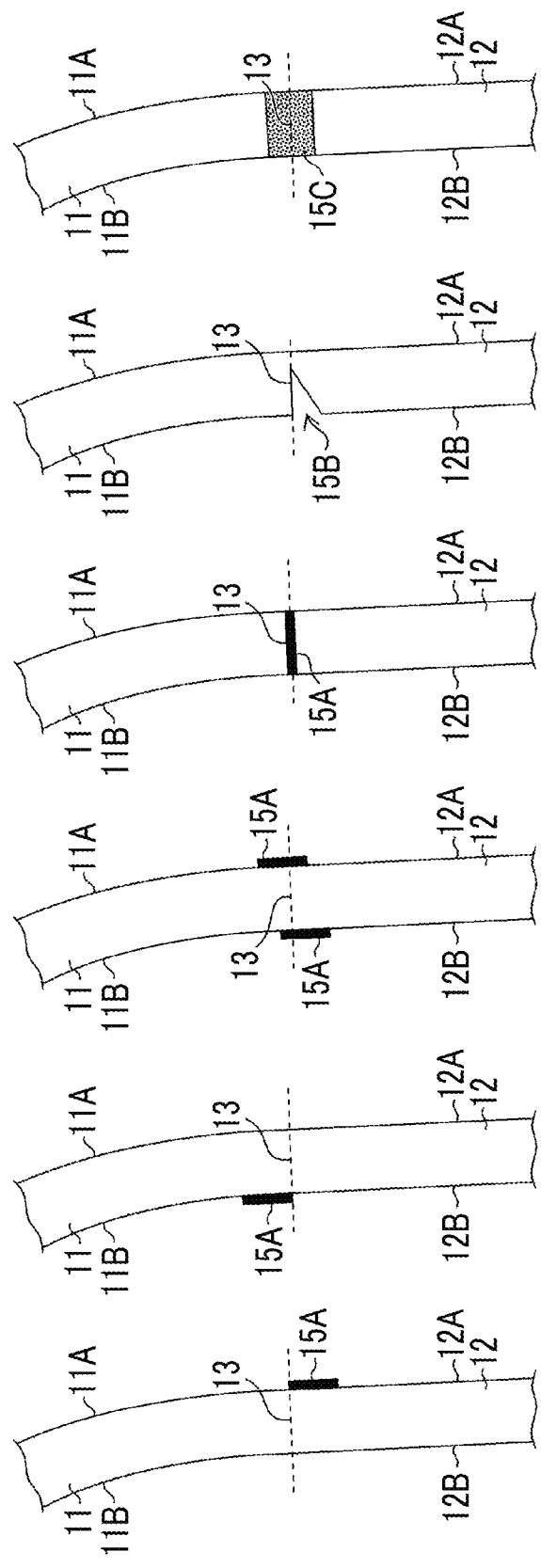

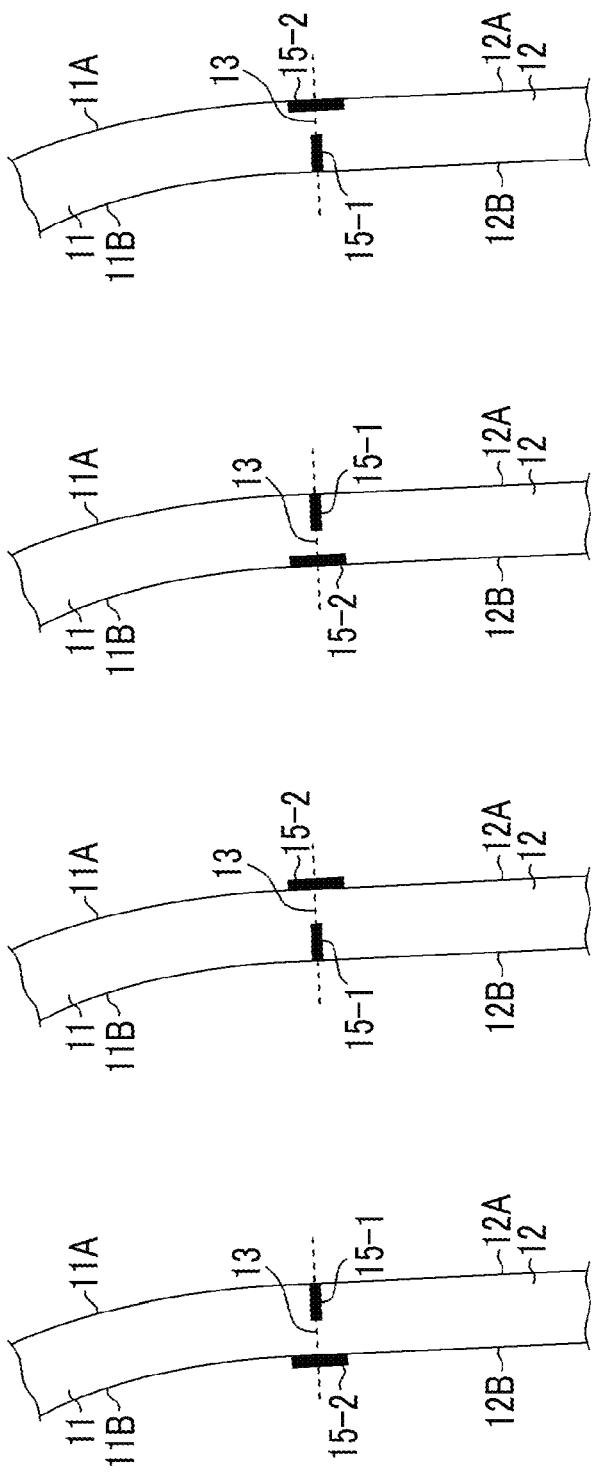

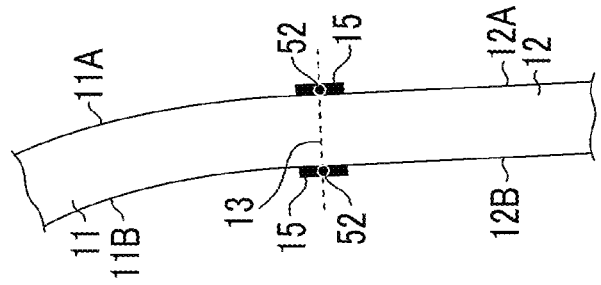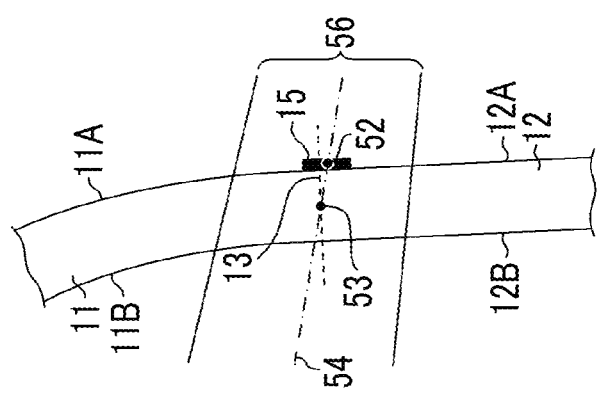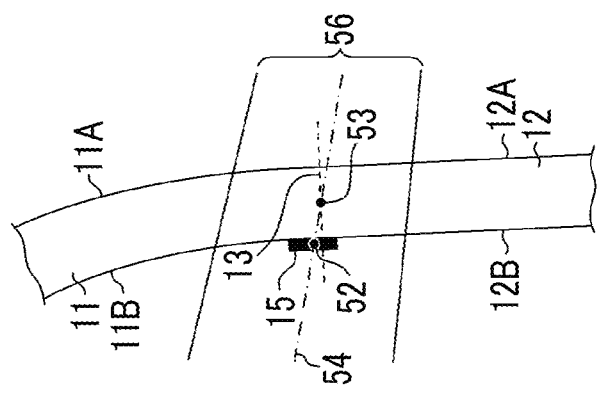

| HEIGHT OF LIGHT -SHIELDING PART | 0% | 20% | 40% | 60% | 80% | 100% |
|---|---|---|---|---|---|---|
| EVALUATION OF QUANTITY OF LIGHT | VERY GOOD | GOOD | GOOD | NORMAL | NORMAL | NOT GOOD |
| EVALUATION OF BLURRING | NOT GOOD | NORMAL | NORMAL | GOOD | GOOD | - |

DOME COVER FOR CAMERA AND CAMERA WITH COVER

CROSS-REFERENCE TO RELATED APPLICATIONS

The present application is a Continuation of PCT International Application No. PCT/JP2015/083964 filed on Dec. 3, 2015 claiming priority under 35 U.S.C § 119(a) to Japanese Patent Application No. 2015-72937 filed on Mar. 31, 2015. Each of the above applications is hereby expressly incorporated by reference, in their entirety, into the present application.

BACKGROUND OF THE INVENTION

1. Field of the Invention

The present invention relates to a dome cover for a camera and a camera with a cover, and particularly, to a dome cover for a camera and a camera with a cover capable of imaging in a state where the camera is covered.

2. Description of the Related Art

Pan tilt cameras capable of changing an imaging direction have been known from the past. The pan tilt cameras may be covered with a dome cover (a dome cover for a camera) from viewpoints of dust-proofing, drip-proofing, and failure prevention.

The dome cover for a camera is often manufactured by a material that is transparent or allows the light from a subject to pass therethrough so as not to hinder imaging of the pan tilt cameras. Additionally, various shapes are suggested as the shape of the dome cover for a camera. However, depending on the shape of the dome cover for a camera, there is a case where deterioration of blurring or the like may occur in images acquired by the pan tilt cameras. Techniques aimed at suppressing such image deterioration have been suggested up till now.

For example, a dome cover for a camera composed of a hemisphere and a cylinder is described in JP2014-44429A. The technique described in JP2014-44429A aims at shielding a portion of the light incident on a camera lens to suppress deterioration of an acquired image in a case where the tilt angle of the camera lens exceeds a threshold value.

Additionally, for example, a dome cover for a camera in the form of a portion of a hemisphere formed by connecting two components and a dome cover for a camera composed of a hemisphere and a cylinder are described in JP2012-205357A. In the technique described in JP2012-205357A, a technique aimed at providing a light-shielding part (optical absorption body) at a connecting part between two components, thereby suppressing aberration resulting from connecting part, is disclosed.

SUMMARY OF THE INVENTION

However, in the technique described in JP2014-44429A, in order to solve deterioration of an image, an entire region of a lens is covered with a polarizing filter or half of the visual field of the lens is covered with a shielding filter. Thus, an effectively visually-recognizable range becomes narrow in an acquired image.

Additionally, since the dome cover for a camera described in JP2012-205357A is formed by connecting two components, there is a possibility that cracking may occur with the connecting part as a base point, and there is a case where durability may deteriorate.

The invention has been made in view of such circumstances and an object thereof is to provide a dome cover for a camera and a camera with a cover that can effectively acquire an image in which a visually-recognizable range is wide and blurring is suppressed and that are durable.

A dome cover for a camera that is one aspect of the invention for achieving the above object comprises a curved section of which a front surface and a back surface have a spherical shape; a skirt section of which a front surface and a back surface have a cylinder shape; and a light-shielding part that shields a part or whole of at least one of light that is incident from the skirt section and is emitted from the curved section or light that is incident from the curved section and is emitted from the skirt section. The curved section and the skirt section are integrally molded.

According to the present aspect, since the light-shielding part is provided to shield a part or whole of at least one of the light that is incident from the skirt section and is emitted from the curved section or the light that is incident from the curved section and is emitted the skirt section, the lens effect of the dome cover for a camera can be suppressed. That is, in the present aspect, it is possible to suppress that the dome cover for a camera functions like a lens by shielding the light that has passed through places where the focal lengths of the curved section and the skirt section are different from each other. Accordingly, in the present aspect, in a case where imaging is performed using the dome cover for a camera, a high-definition image in which the blurring resulting from the lens effect of the dome cover for a camera in an acquired image is suppressed can be acquired.

Additionally, according to the present aspect, since the curved section and the skirt section are integrally molded, there is no connecting part in which the possibility of serving as a base point of cracking is high, and durability is good. Additionally, according to the present aspect, since curved section and the skirt section are integrally molded, compared to a dome cover composed of a plurality of components, a step of bonding the components is unnecessary, and manufacturing costs can be reduced. Moreover, according to the present aspect, since the curved section and the skirt section are integrally molded, there is no problem of generation of burrs caused by bonding of a connecting part of the dome cover for a camera composed of a plurality of components.

Preferably, the light-shielding part is provided on at least one of the front surface of the curved section or the front surface of the skirt section.

According to the present aspect, since the light-shielding part is provided on at least one of the front surface of the curved section or the front surface of the skirt section, the light-shielding part can be easily attached.

Preferably, the light-shielding part is provided on at least one of the back surface of the curved section or the back surface of the skirt section.

According to the present aspect, since the light-shielding part is provided on at least one of the back surface of the curved section or the back surface of the skirt section, damage to the light-shielding part can be prevented, and the durability of the dome cover for a camera is improved.

Preferably, the light-shielding part may be provided on at least one of the front surface of the curved section or the front surface of the skirt section and is provided on at least one of the back surface of the curved section or the back surface of the skirt section.

According to the present aspect, the light-shielding part may be provided on at least one of the front surface of the curved section or the front surface of the skirt section and is provided on at least one of the back surface of the curved section or the back surface of the skirt section. That is, according to the present aspect, since the light-shielding parts are provided in two places including the front surface and the back surface of the dome cover for a camera, occurrence of blurring in an acquired image, which is caused by an error in positions where the light-shielding parts are installed can be suppressed.

Preferably, a central point of a longitudinal section of the light-shielding part is located on the same plane as a boundary surface between the curved section and the skirt section.

According to the present aspect, since the central point of a longitudinal section of the light-shielding part is located on the same plane as a boundary surface between the curved section and the skirt section, the light-shielding part can effectively shield the light that crosses the boundary surface.

Preferably, the light-shielding part is disposed on a boundary surface between the curved section and the skirt section.

According to the present aspect, since the light-shielding part is disposed on the boundary surface between the curved section and the skirt section, slip-out of the light-shielding part and damage thereto can be prevented.

Preferably, the light-shielding part is disposed on a portion of a boundary surface between the curved section and the skirt section.

According to the present aspect, since the curved section is disposed on a portion of the boundary surface between the curved section and the skirt section, a portion of the light that crosses the boundary surface can be shielded. Additionally, according to the present aspect, since the curved section has a portion that is continuous with the skirt section, integral molding of the dome cover for a camera is performed better.

Preferably, the light-shielding part includes a first light-shielding part and a second light-shielding part, and the first light-shielding part is a portion of the boundary surface between the curved section and the skirt section and is disposed on the front surface side of the curved section and the skirt section, and the second light-shielding part is provided on the back surface of the curved section and the back surface of the skirt section.

According to the present aspect, since the light-shielding part includes the first light-shielding part and the second light-shielding part, and the first light-shielding part is a portion of the boundary surface between the curved section and the skirt section and is disposed on the front surface side of the curved section and the skirt section, and the second light-shielding part is provided on the back surface of the curved section and the back surface of the skirt section, shielding of the light that crosses the boundary surface is performed more accurately, and integral molding is performed better.

Preferably, the light-shielding part includes a first light-shielding part and a second light-shielding part, and the first light-shielding part is a portion of the boundary surface between the curved section and the skirt section and is disposed on the back surface side of the curved section and the skirt section, and the second light-shielding part is provided on the back surface of the curved section and the front surface of the skirt section.

According to the present aspect, the first light-shielding part is a portion of the boundary surface between the curved section and the skirt section and is disposed on the back surface side of the curved section and the skirt section, and the second light-shielding part is provided on the front surface of the curved section and the back surface of the skirt section, shielding of the light that crosses the boundary surface is performed more accurately, and integral molding is performed better.

Preferably, the light-shielding part is a light-shielding plate.

According to the present aspect, since the light-shielding part is the light-shielding plate, the light-shielding part can be easily attached.

Preferably, the light-shielding part performs light-shielding by reflecting light.

According to the present aspect, since the light-shielding part performs light-shielding by reflecting light, shielding is performed better.

Preferably, the light-shielding part includes an air part.

According to the present aspect, since the light-shielding part includes the air part, shielding is performed better.

Preferably, the light-shielding part performs light-shielding by irregularly reflecting light.

According to the present aspect, sine the light-shielding part performs light-shielding by irregularly reflecting light, light-shielding is performed better.

Preferably, the light-shielding part includes a plurality of particles.

According to the present aspect, since the light-shielding part includes the plurality of particles, integral molding of the dome cover for a camera including the light-shielding part is performed better.

Preferably, the dome cover for a camera is manufactured by injection molding.

According to the present aspect, the dome cover for a camera is manufactured by the injection molding, the integral molding is performed better.

A camera with a cover that is another aspect of the invention comprises a camera device; and a dome cover for a camera including a curved section of which a front surface and a back surface have a spherical shape, a skirt section of which a front surface and a back surface have a cylinder shape, and a light-shielding part that shields a part or whole of at least one of light that is incident from the skirt section and is emitted from the curved section or light that is incident from the curved section and is emitted from the skirt section. The curved section and the skirt section are integrally molded. The light-shielding part has a size to shield only a portion of a region where a beam of light received by the camera device passes through the dome cover for a camera.

According to the present aspect, since the light-shielding part is provided to shield a part or whole of at least one of the light that is incident from the skirt section and is emitted from the curved section or the light that is incident from the curved section and is emitted the skirt section, a high-definition captured image in which the lens effect of the dome cover for a camera is suppressed is can be acquired. That is, in the present aspect, a high-definition image in which blurring resulting from the lens effect of the dome cover for a camera is suppressed can be acquired by using the dome cover for a camera that suppresses the dome cover for a camera functions like a lens by shielding the light that has passed through places where the focal lengths of the curved section and the skirt section are different from each other.

Additionally, according to the present aspect, since the curved section and the skirt section are integrally molded, there is no connecting part serving as a base point of cracking of the dome cover for a camera, and durability is good. Additionally, according to the present aspect, since curved section and the skirt section are integrally molded, compared to a dome cover composed of a plurality of components, a step of bonding the components is unnecessary, and manufacturing costs can be reduced. Moreover, according to the present aspect, since the curved section and the skirt section are integrally molded, there is no problem of generation of burrs caused by bonding of a connecting part of the dome cover composed of a plurality of components.

Preferably, the camera device is provided in a space surrounded by a plane including the boundary surface between the curved section and the skirt section and the back surface of the skirt section, and the light-shielding part includes a first light-shielding part and a second light-shielding part, the first light-shielding part is provided on the front surface of the curved section, and the second light-shielding part is provided on the back surface of the skirt section.

Accordingly, in the present aspect in a case where the camera device is provided in the space surrounded by the plane including the boundary surface between the curved section and the skirt section and the skirt section, the first light-shielding part is provided on the front surface of the curved section, and the second light-shielding part is provided on the back surface of the skirt section. Accordingly, in the present aspect, a portion of the light that crosses the boundary surface between the curved section and the skirt section can be shielded even in a case where the camera device is installed on the skirt section side of the dome cover for a camera.

Preferably, the camera device is provided in a space surrounded by a plane including the boundary surface between the curved section and the skirt section and the back surface of the curved section, and the light-shielding part includes a first light-shielding part and a second light-shielding part, the first light-shielding part is provided on the front surface of the skirt section, and the second light-shielding part is provided on the back surface of the curved section.

Accordingly, in the present aspect, in a case where the camera device is provided in the space surrounded by the plane including the boundary surface between the curved section and the skirt section, the light-shielding part includes the first light-shielding part and the second light-shielding part, the first light-shielding part is provided on the front surface of the skirt section, and the second light-shielding part is provided on the back surface of the curved section. Accordingly, in the present aspect, a portion of the light influenced by the lens effect of the dome cover for a camera can be shielded even in a case where the camera device is installed on the curved section side of the dome cover for a camera.

Preferably, a height of a longitudinal section of the light-shielding part is 20% or more and 80% or less of a height Y of a longitudinal section of a region, through which a beam expressed by the following equation passes, in the dome cover for a camera.

$$Y = d \times (L - L1)/L$$

Where d represents a stop diameter of the camera device, L represents a distance from a stop of the camera device to a subject, and L1 represents a distance from the stop of the camera device to the light-shielding part.

According to the present aspect, since the height of the longitudinal section of the light-shielding part is 20% or more and 80% or less of the height Y of the longitudinal section of the dome cover passage region of the beam expressed by the above equation, an image in which blurring is suppressed and a visually-recognizable range is large is acquired.

Preferably, a central point of the longitudinal section of the light-shielding part is on a main light ray of an imaging optical system of the camera device passing through a central point on a boundary surface between the curved section and the skirt section of the dome cover for a camera.

According to the present aspect, since the central point of the longitudinal section of the light-shielding part is on the main light ray of the imaging optical system of the camera device passing through the central point on the boundary surface between the curved section and the skirt section of the dome cover for a camera, the light that crosses a boundary surface can be more effectively shielded.

According to the present aspect, since the light-shielding part is provided to shield a part or whole of at least one of the light that is incident from the skirt section and is emitted from the curved section or the light that is incident from the curved section and is emitted the skirt section, it is possible to provide the dome cover for a camera and the camera with a cover that can suppress that the dome cover for a camera functions like a lens and that can acquire a high-definition image in which blurring is suppressed in an acquired image. Additionally, according to the invention, since the curved section and the skirt section are integrally molded, it is possible to provide the dome cover for a camera and the camera with a cover that is durable without a connecting part serving as a base point of cracking.

BRIEF DESCRIPTION OF THE DRAWINGS

FIGS. 1A and 1B are views illustrating an external appearance of a camera with a cover.

FIGS. 2A to 2D are longitudinal sectional views of the camera with a cover.

FIGS. 11A to 11F are enlarged views in the vicinity of the boundary surface.

FIGS. 13A to 13D are enlarged views in the vicinity of the boundary surface.

FIGS. 14A to 14C are enlarged views in the vicinity of the boundary surface.

DESCRIPTION OF THE PREFERRED EMBODIMENTS

Figure 3:
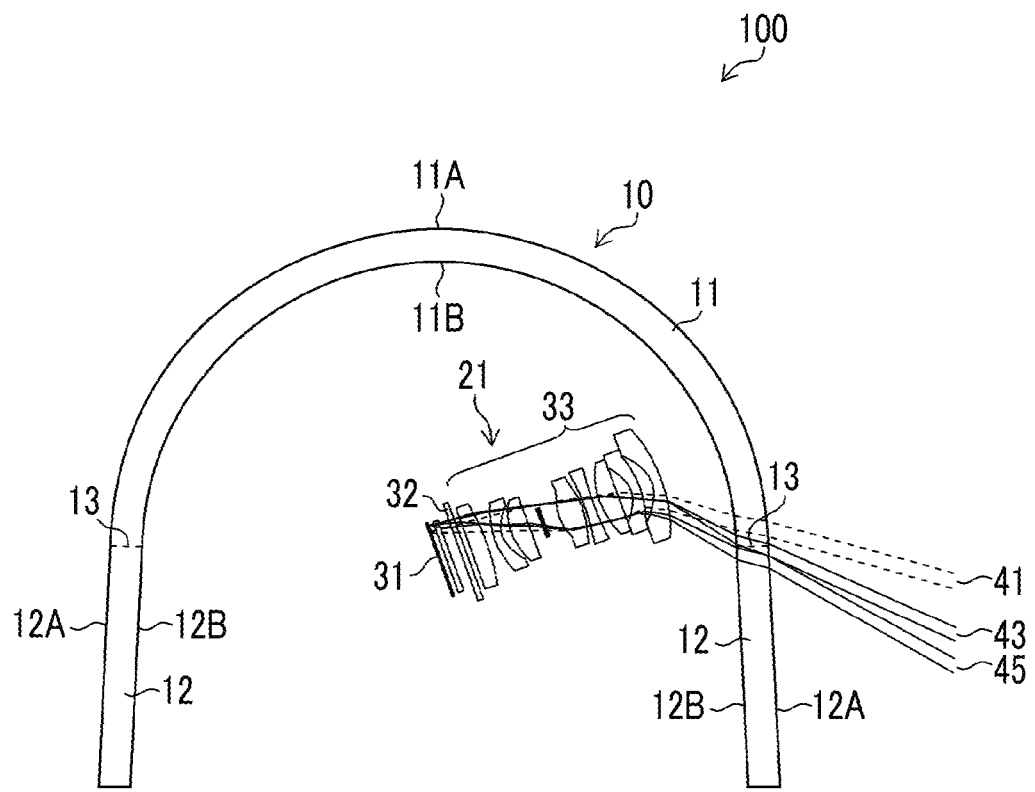
FIG. 3 is a longitudinal sectional view of the camera with a cover.

Hereinafter, embodiments of a dome cover for a camera and a camera with a cover related to the invention will be described according to the accompanying drawings.

FIGS. 1A and 1B are views illustrating an external appearance of a camera 100 with a cover. FIG. 1A is a view illustrating the external appearance of the camera 100 with a cover, and FIG. 1B is a view illustrating a case where a dome cover 10 for a camera is removed in the camera 100 with a cover illustrated by FIG. 1A.

As illustrated in FIG. 1A, the camera 100 with a cover mainly has a camera device 25 that performs imaging, the dome cover 10 for a camera provided so as to cover the camera device 25, and a pedestal 23 that functions as a turntable in a pan direction of the camera device 25. The dome cover 10 for a camera is detachable, and replacement of the dome cover 10 for a camera is performed if necessary. Additionally, the camera device 25 has an imaging unit 21, and an image is acquired by a subject being imaged by the imaging unit 21.

A case where the dome cover 10 for a camera is removed is illustrated in FIG. 1B. The imaging unit 21 of the camera device 25 includes an optical system 33 composed of a lens group and an imaging element 31, and receives light, which has passed through the optical system 33, using the imaging element 31 (FIG. 3) to acquire an image.

The camera device 25 is rotatable on the pedestal 23 in the pan direction as illustrated by arrow A. Additionally, the imaging unit 21 of the camera device 25 is capable of being driven in a tilt direction as illustrated by arrow B. That is, the camera 100 with a cover is a pan tilt camera capable of controlling an imaging direction in the pan direction and the tilt direction. In addition, the camera 100 with a cover is not limited to the pan tilt camera. For example, as the camera 100 with a cover, a camera that can control the imaging direction only in the pan direction, a camera that can control the imaging direction only in the tilt direction, or a camera that images a fixed point can be adopted.

FIGS. 2A to 2D are longitudinal sectional views of the camera 100 with a cover illustrated in FIGS. 1A and 1B. In addition, only the imaging unit 21 is described regarding the camera device 25. The imaging unit 21 of the camera 100 with a cover that turns in the tilt direction (refer to arrow B of FIGS. 1A and 1B) will be described with reference to FIGS. 2A to 2D. Additionally, the longitudinal section in the description of the present application refers to a section taken along a plane perpendicularly intersecting a plane passing through a top part of the dome cover 10 for a camera and including an opening end part of the dome cover 10 for a camera.

A case where the tilt angle is 0° is illustrated in FIG. 2A, a case where the tilt angle is 45° is illustrated in FIG. 2B, a case where the tilt angle is 70° is illustrated in FIG. 2C, and a case where the tilt angle is 90° is illustrated in FIG. 2D. In this way, an imaging range 22 of the imaging unit 21 varies according to the tilt angle of the imaging unit 21.

FIG. 3 is a longitudinal sectional view of the camera 100 with a cover. In addition, only the imaging unit 21 is described regarding the camera device 25, and illustration of a light-shielding part 15 is omitted.

The dome cover 10 for a camera is composed of a curved section 11 and a skirt section 12, and the curved section 11 and the skirt section 12 are connected together at a boundary surface 13. Additionally, the curved section 11 and the skirt section 12 of the dome cover 10 for a camera are integrally molded, and for example, the dome cover 10 for a camera is manufactured by injection molding. In a case where the dome cover 10 for a camera is injection-molded, the dome cover 10 for a camera is manufactured by injecting resin into a mold for dome cover 10 for a camera having the curved section 11 and the skirt section 12. In addition, the light-shielding part 15 (FIGS. 8A and 8B) may be integrally molded with the curved section 11 and the skirt section 12, or may be attached to the integrally molded dome cover 10 for a camera.

In this way, by integrally molding the curved section 11 and the skirt section 12, it is possible to obtain a dome cover 10 for a camera that is durable without a connecting part serving as a base point of cracking of the dome cover 10 for a camera.

Additionally, in the dome cover 10 for a camera, the curved section 11 and the skirt section 12 are integrally molded. Thus, compared to a dome cover composed of a plurality of components, it is unnecessary to perform a step of bonding the components, and manufacturing costs can be reduced.

Moreover, in the dome cover 10 for a camera, the curved section 11 and the skirt section 12 are integrally molded. Thus, it is unnecessary to bond the curved section 11 and the skirt section 12 together with an adhesive or the like, and a problem of generation of burrs does not occur. Here, the integral molding means that the curved section 11 and the skirt section 12 are integrally molded without using secondary bonding or mechanical joining.

The curved section 11 has a front surface 11A and a back surface 11B, and the front surface 11A of the curved section 11 and the back surface 11B of the curved section 11 have a spherical shape. Here, the spherical shape means including various spherical shapes and is not particularly limited if these spherical shapes are curved shapes. For example, the spherical shapes are a semispherical shape, an elliptical shape, and a hyperelliptical shape.

The skirt section 12 has a front surface 12A and a back surface 12B, and a cylinder shape is formed by the front surface 12A of the skirt section 12 and the back surface 12B of the skirt section 12. Here, the "cylinder shape" means round, elongated, and hollow. For example, the cylinder shape is a hollow shape of a truncated cone or a cylindrical shape.

The curved section 11 and the skirt section 12 are connected together at the boundary surface 13, and a longitudinal section of the boundary surface 13 is linear as illustrated in FIG. 3. The boundary surface 13 is a boundary between the curved section 11 and the skirt section 12, and is a boundary between a curved place and a linear place on the front surface of the dome cover 10 for a camera. For example, the boundary surface 13 is a plane including a point on the front surface 11A of the curved section 11 having a tangential line parallel to a straight line in a longitudinal section represented by the front surface 12A of the skirt section 12 and perpendicularly intersecting the tangential line.

The imaging unit 21 has the optical system 33 consisting of a plurality of lenses, a stop 32 and the imaging element 31. The combination of the plurality of lenses that constitute the optical system 33 is not limited, but combinations of various lenses can be adopted.

The imaging element 31 has a condensing microlens, color filters, such as R (red), F (green), and B (blue) filters, and image sensors (a photodiode; a complementary metal oxide semiconductor (CMOS), a charge-coupled device (CCD), and the like).

A first beam 41, a second beam 43, and a third beam 45 passing through the vicinity of the boundary surface 13 are illustrated in FIG. 3.

The first beam 41 is incident on the dome cover 10 for a camera from the front surface 11A of the curved section 11 and is emitted from the back surface 11B of the curved section 11. The second beam 43 includes the light that is incident on the dome cover 10 for a camera from the front surface 12A of the skirt section 12 and is emitted from the back surface 11B of the curved section 11. The third beam 45 is incident on the dome cover 10 for a camera from the front surface 12A of the skirt section 12 and is emitted from the back surface 12B of the skirt section 12.

The light, as included in the second beam 43, which is incident on the dome cover 10 for a camera from the front surface 12A of the skirt section 12 and is emitted from the back surface 11B of the curved section 11, may cause blurring in a captured image. Additionally, the light, which is incident on the dome cover 10 for a camera from the front surface 11A of the curved section 11 and is emitted from the back surface 12B of the skirt section 12, may cause blurring in a captured image, similar to the second beam 43. As these kinds of light pass through the dome cover 10 for a camera, a difference in a focal length will occur and blurring will occur in a captured image due to a lens effect of the dome cover 10 for a camera.

Next, the first beam 41, the second beam 43, and the third beam 45 passing through the vicinity of the boundary surface 13 will be described.

Figure 4A:
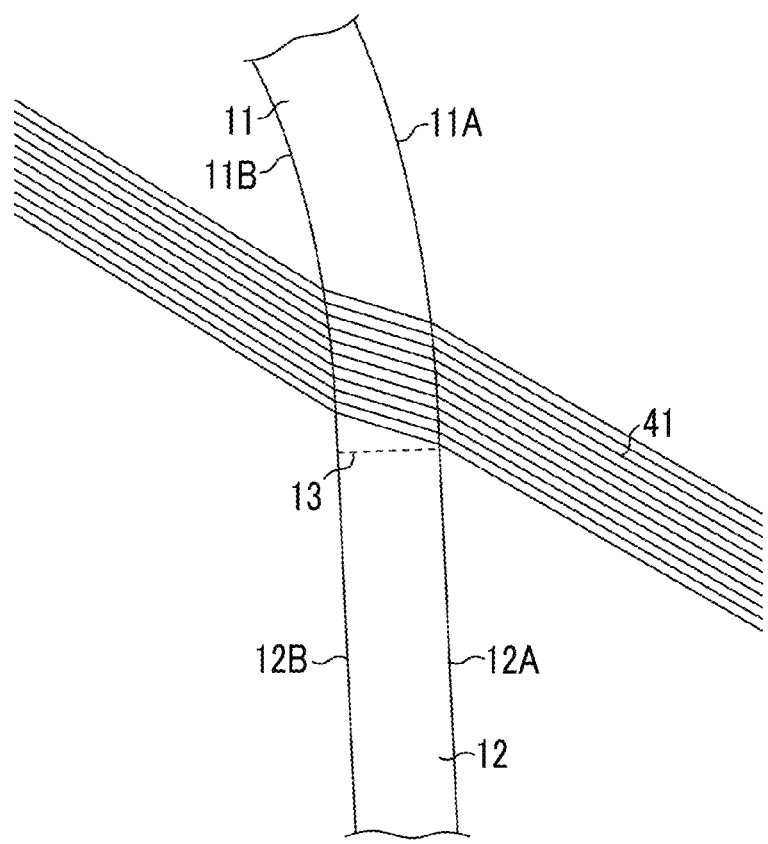
FIGS. 4A and 4B are enlarged views in the vicinity of a boundary surface and a view conceptually illustrating point spreading.

FIG. 4A is an enlarged view in the vicinity of the boundary surface 13 in the longitudinal sectional view illustrated in FIG. 3, and illustrates the first beam 41. The first beam 41 is incident on the dome cover 10 for a camera from the front surface 11A of the curved section 11 and is emitted from the back surface 11B of the curved section 11. In this way, in a case where light is incident from the front surface 11A of the curved section 11 and is emitted from the back surface 11B of the curved section 11, the focal length does not vary in incidence and emission places. Thus, there is no occurrence of blurring resulting from the lens effect of the dome cover 10 for a camera.

Figure 4B:
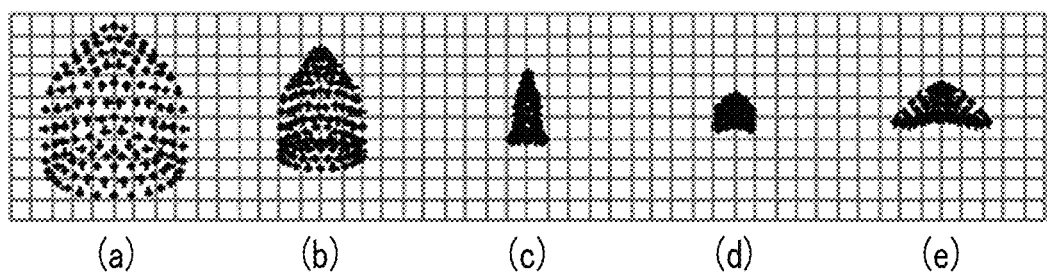

FIG. 4B is a view conceptually illustrating point spreading on an image surface of the imaging element 31. In order from (a) to (e) of FIG. 4B, the point spreading on the image surface of the imaging element 31 from a front focus to a rear focus is conceptually illustrated. In addition, (c) of FIG. 4B illustrates the case of the best focus. In this way, although there is slight point spreading on the image surface of the imaging element 31, the blurring resulting from the lens effect of the dome cover 10 for a camera does not occur.

Figure 5A:
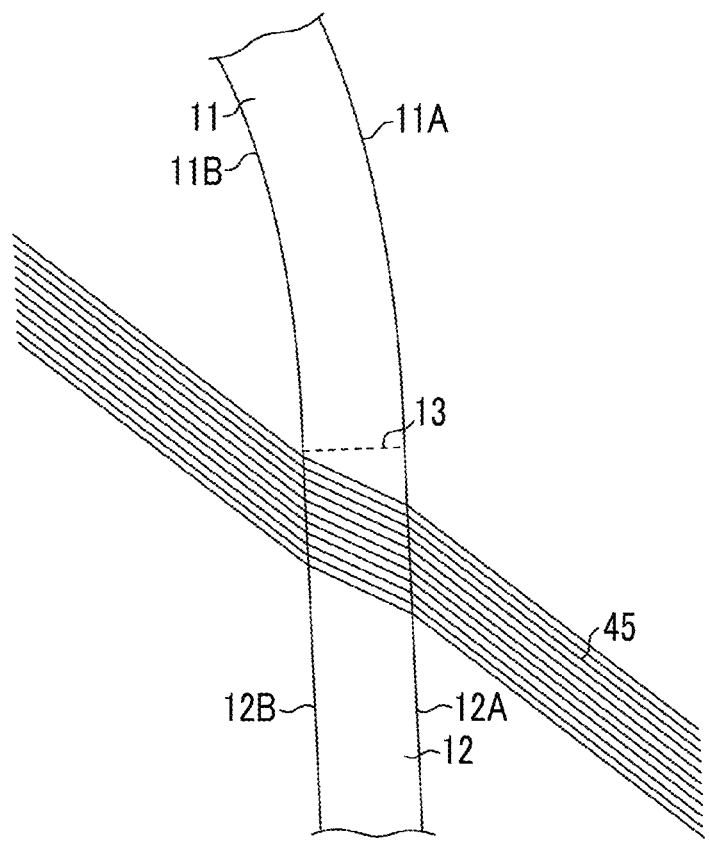
FIGS. 5A and 5B are enlarged views in the vicinity of the boundary surface and a view conceptually illustrating point spreading.

FIG. 5A is an enlarged view in the vicinity of the boundary surface 13 in the longitudinal sectional view illustrated in FIG. 3, and illustrates the third beam 45. The third beam 45 is incident on the dome cover 10 for a camera from the front surface 12A of the skirt section 12 and is emitted from the back surface 12B of the skirt section 12. In this way, in a case where light is incident from the front surface 12A of the skirt section 12 and is emitted from the back surface 12B of the skirt section 12, the focal length does not vary in incidence and emission places. Thus, there is no occurrence of blurring resulting from the lens effect of the dome cover 10 for a camera.

Figure 5B:
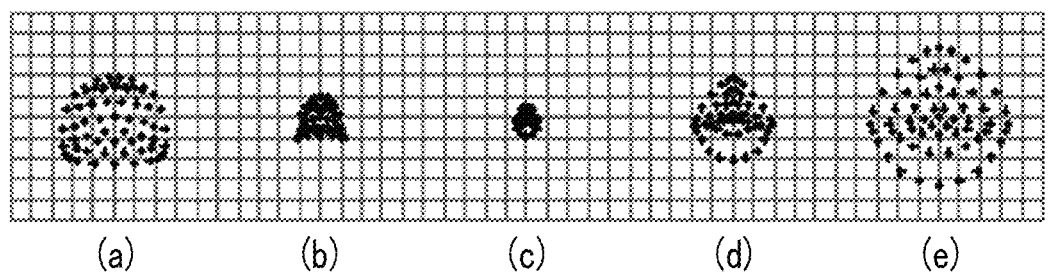

FIG. 5B is a view conceptually illustrating point spreading on the image surface of the imaging element 31. In order from (a) to (e) of FIG. 5B, the point spreading on the image surface of the imaging element 31 from a front focus to a rear focus is conceptually illustrated. In addition, (c) of FIG. 5B illustrates the case of the best focus. In this way, although there is slight point spreading on the image surface of the imaging element 31, the blurring resulting from the lens effect of the dome cover 10 for a camera does not occur.

Figure 6A:
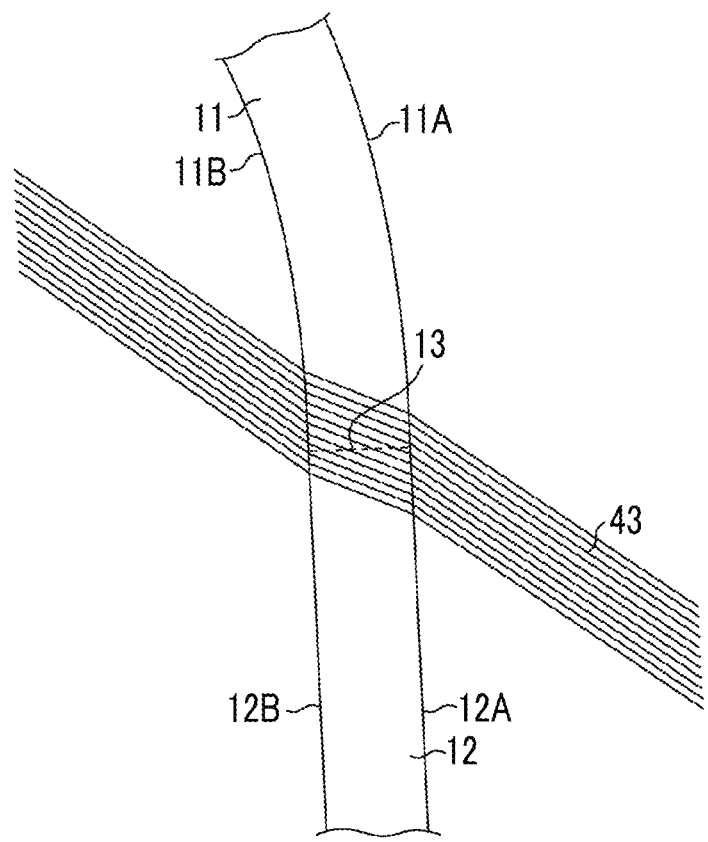
FIGS. 6A and 6B are enlarged views in the vicinity of the boundary surface and a view conceptually illustrating point spreading.

FIG. 6A is an enlarged view in the vicinity of the boundary surface 13 in the longitudinal sectional view illustrated in FIG. 3, and illustrates the second beam 43. Partial light of the second beam 43 is incident on the dome cover 10 for a camera from the front surface 12A of the skirt section 12 and is emitted from the back surface 11B of the curved section 11. In this way, in the light that is incident from the front surface 12A of the skirt section 12 and is emitted from the back surface 11B of the curved section 11, the focal length does not vary in incidence and emission places, which causes blurring in an image.

Figure 6B:
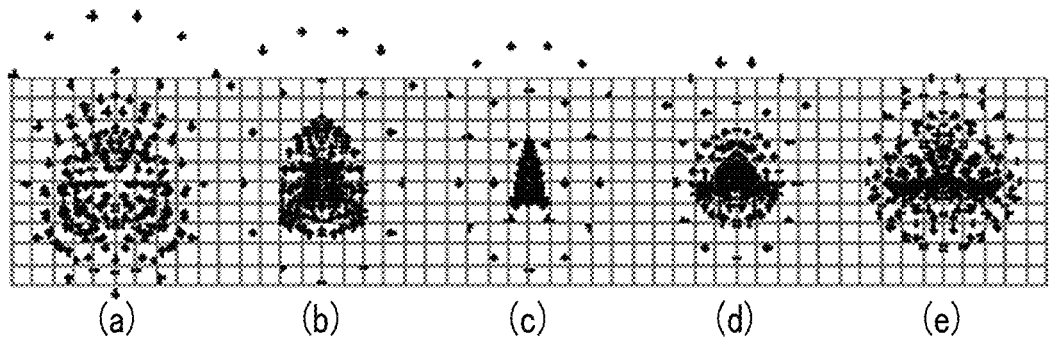

FIG. 6B is a view conceptually illustrating point spreading in a case where point images on the imaging element 31 are captured. In order from (a) to (e) of FIG. 6B, the point spreading on the image surface of the imaging element 31 from a front focus to a rear focus is conceptually illustrated. In addition, (c) of FIG. 6B illustrates the case of the best focus. As illustrated in FIG. 6B, in images of light rays that pass through the boundary surface 13 between the curved section 11 and the skirt section 12, the point spreading on the image surface of the imaging element 31 becomes large. In this way, as a cause that the point spreading becomes large, it is considered that the light that passes through places where the focal lengths are different in incidence and emission places receives the lens effect of the dome cover 10 for a camera.

Figure 7:
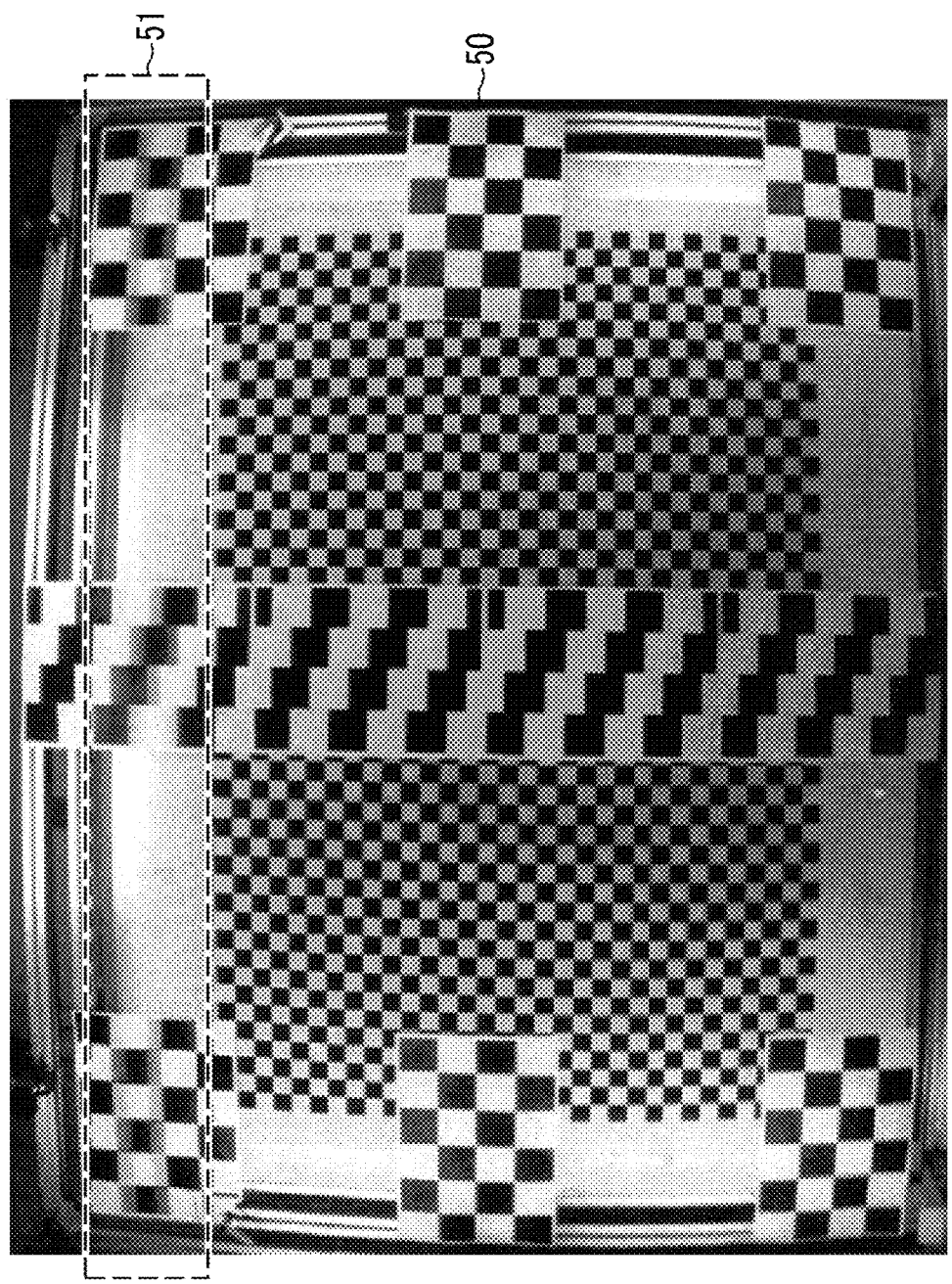
FIG. 7 is a view illustrating a captured image.

FIG. 7 is a view illustrating a captured image acquired by the camera 100 with a cover illustrated in FIG. 3. In addition, the captured image of FIG. 7 is captured without providing the dome cover 10 for a camera with the light-shielding part 15 (FIGS. 8A and 8B).

The captured image 50 illustrated in FIG. 7 has a blurring region 51 where blurring occurs at a certain image height. This is blurring resulting from the light that crosses the boundary surface 13 of the dome cover 10 for a camera, as will be described in FIGS. 6A and 6B. In the invention, a technique capable of efficiently suppressing this blurring and acquiring a captured image 50 of which a visually-recognizable range is large is provided.

Next, a case where the light that crosses the boundary surface 13 of the dome cover 10 for a camera is shielded by providing the light-shielding part 15 will be described. In addition, a case where light is totally cut off like total shielding and also a case where light is transmitted in a range where the effect of the invention is not hindered are included in the shielding in the present application. For example, the shielding in the present application means that the transmittance of light is 10% or less.

Figure 8A:
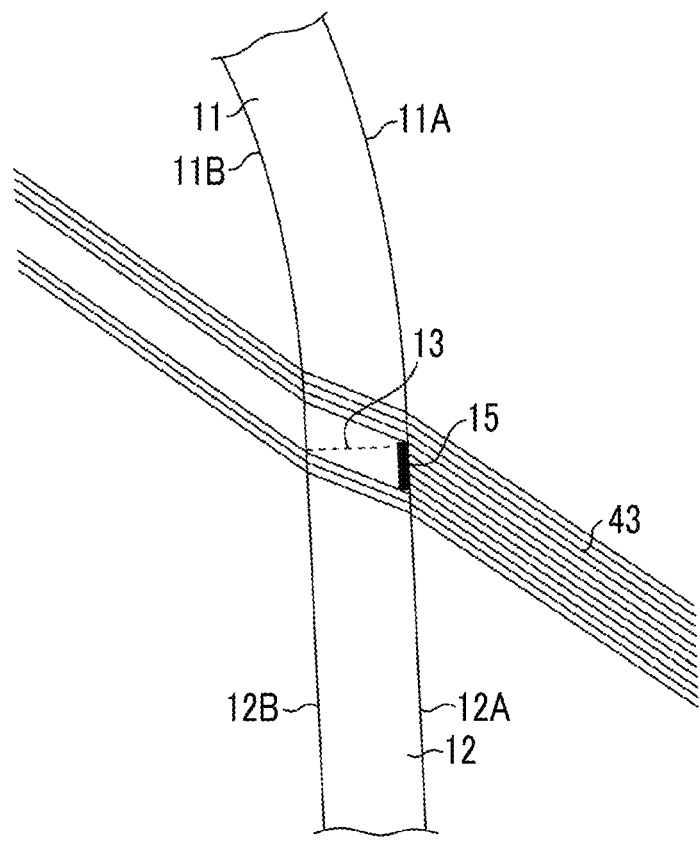
FIGS. 8A and 8B are enlarged views in the vicinity of the boundary surface and a view conceptually illustrating point spreading.
Figure 8B:
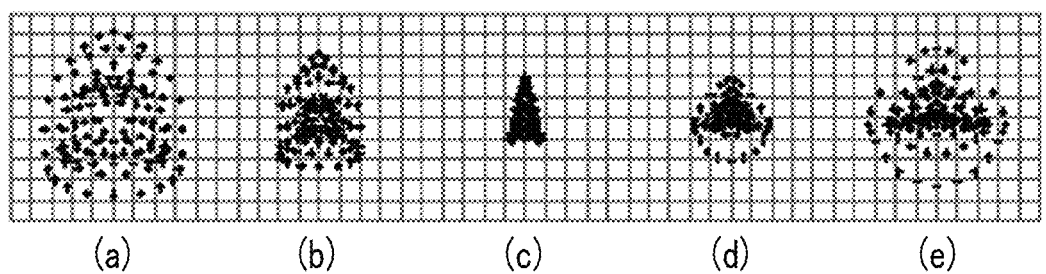

FIGS. 8A and 8B illustrate an example in which the dome cover 10 for a camera illustrated in FIGS. 6A and 6B is provided with the light-shielding part 15. As illustrated in FIG. 8A, by providing the light-shielding part 15, the light of the second beam 43, which that crosses the boundary surface 13 between the curved section 11 and the skirt section 12, can be shielded, and the blurring of the captured image 50 can be suppressed. That is, the light-shielding part 15 suppresses the blurring of the captured image 50 by shielding a part or whole of at least one of the light that is incident from the skirt section 12 and is emitted from the curved section 11 or the light that is incident from the curved section 11 and is emitted the skirt section 12.

FIG. 8B is a view conceptually illustrating point spreading on the image surface of the imaging element 31 in a case where point images are captured. If FIG. 6B illustrating the point spreading in a case where the light-shielding part 15 is not provided is compared with FIG. 8B illustrating the point spreading in a case where the light-shielding part 15 is provided, it can be seen that the point spreading is suppressed by providing the light-shielding part 15. In this way, by providing the light-shielding part 15 to shield the light that crosses the boundary surface 13, blurring of a captured image can be suppressed.

Figure 9:
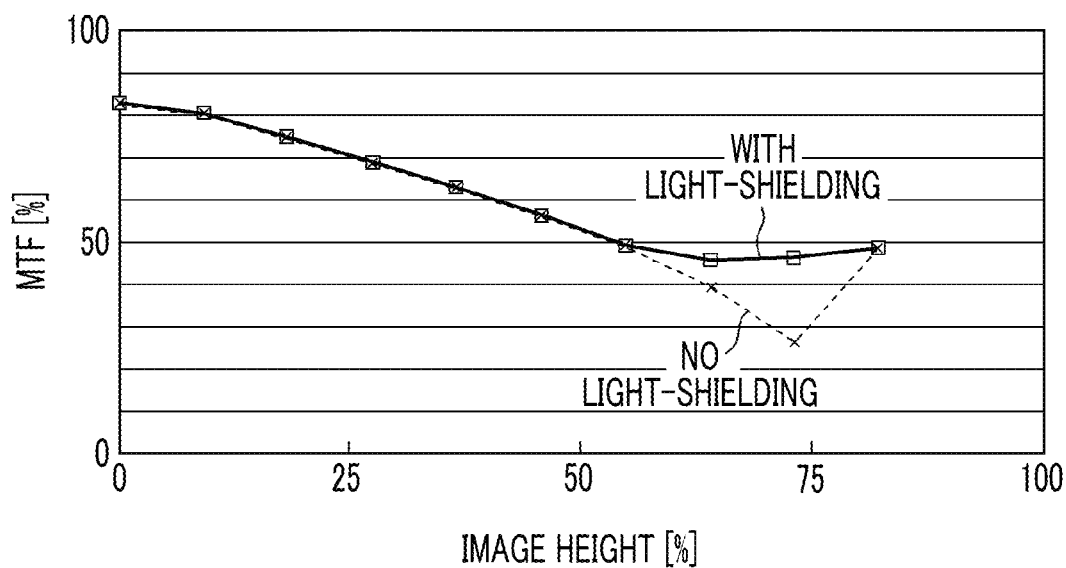
FIG. 9 is a graph illustrating modulation transfer function characteristics of captured images.

FIG. 9 is a graph illustrating modulation transfer function (MTF) characteristics at respective image heights of an acquired image. In addition, in the graph illustrated in FIG. 9, a vertical axis represents an MTF, and a horizontal axis represents an image height. In FIG. 9, a solid line represents the MTF of an image captured using the dome cover 10 for a camera provided with the light-shielding part 15, and a dotted line represents the MTF of an image captured using the dome cover 10 for a camera that is not provided with the light-shielding part 15.

In the image captured using the dome cover 10 for a camera that is not provided with the light-shielding part 15, the MTF falls sharply around 75% of the image height. This means that the blurring resulting from the light that crosses the boundary surface 13 occurs in the captured image 50 as described above. Meanwhile, in the captured image 50 captured using the dome cover 10 for a camera provided with the light-shielding part 15, the light that crosses the boundary surface 13 is shielded by the light-shielding part 15 to suppress blurring. Therefore, there is no sharp decline in the MTF. In this way, an image in which the MTF shows an excellent value can be acquired by shielding the light that crosses the boundary surface 13 using the light-shielding part 15.

Figure 10:
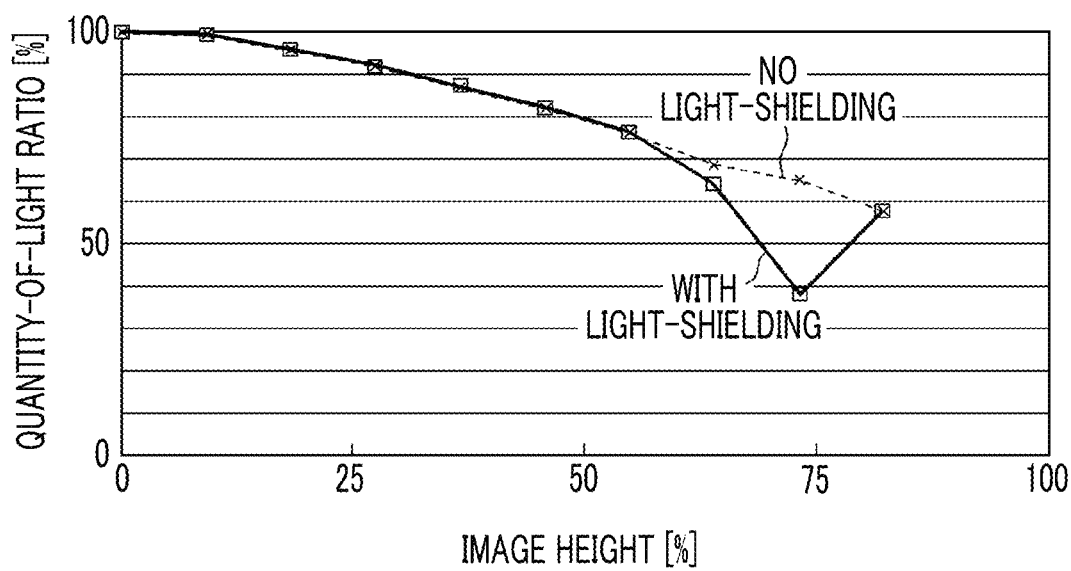
FIG. 10 is a graph illustrating the quantities of light at respective image heights of captured images.

FIG. 10 is a graph illustrating the quantities of light at respective image heights of an acquired image. In addition, in the graph illustrated in FIG. 10, a vertical axis represents a quantity-of-light ratio, and a horizontal axis represents an image height. In FIG. 10, a solid line represents the quantity of light of an image captured using the dome cover 10 for a camera provided with the light-shielding part 15, and a dotted line represents the quantity of light of an image captured using the dome cover 10 for a camera that is not provided with the light-shielding part 15.

In the captured image 50 captured using the dome cover 10 for a camera that is not provided with the light-shielding part 15, a decline in the quantity of light is suppressed. In the captured image 50 captured using the dome cover 10 for a camera that, on the other hand, provided the light-shielding part 15, there is a decline in the quantity of light due to shielding using the light-shielding part 15. However, by adjusting the size and the position of the light-shielding part 15, a decline in the quantity of light can be suppressed, and a range where the quantity of light decreases can be suppressed.

As described above, in the invention, by providing the light-shielding part 15 that shields a part or whole of at least one of the light that is incident from the skirt section 12 and is emitted from the curved section 11 or the light that is incident from the curved section 11 and is emitted the skirt section 12, the lens effect of the dome cover 10 for a camera can be suppressed. That is, the invention can suppress that the dome cover 10 for a camera functions like a lens by shielding the light that has passed through places where the focal lengths of the curved section 11 and the skirt section 12 are different from each other. Accordingly, in the present aspect, a high-definition image in which the blurring resulting from the lens effect of the dome cover 10 for a camera in an acquired image is suppressed can be acquired.

Next, specific examples of the light-shielding part 15 will be described. FIG. 11 is an enlarged view in the vicinity of the boundary surface 13, and is a view illustrating the specific examples of the light-shielding part 15.

FIG. 11A, FIG. 11B, and FIG. 11C illustrate cases where a light-shielding plate 15A is used as the light-shielding part 15.

The light-shielding part 15 may be provided on at least one of the front surface 11A of the curved section 11 or the front surface 12A of the skirt section 12, and may be provided on at least one of the back surface 11B of the curved section 11 or the back surface 12B of the skirt section 12. For example, in FIG. 11A, the light-shielding plate 15A is provided on the front surface 12A of the skirt section 12. By providing the light-shielding plate 15A on the front surface 12A of the skirt section 12, the light, which is incident from the front surface 12A of the skirt section 12 crosses the boundary surface 13 between the curved section 11 and the skirt section 12, and is emitted from the back surface 11B of the curved section 11, can be shielded. Additionally, for example, in FIG. 11B, the light-shielding plate 15A is provided on the back surface 11B of the curved section 11. By providing the light-shielding plate 15A on the back surface 11B of the curved section 11, similar to the case of FIG. 11A, the light, which is incident from the front surface 12A of the skirt section 12, crosses the boundary surface 13 between the curved section 11 and the skirt section 12, and is emitted from the back surface 11B of the curved section 11, can be shielded.

Additionally, the light-shielding part 15 may be provided on at least one of the front surface 11A of the curved section 11 or the front surface 12A of the skirt section 12, and may be provided on at least one of the back surface 11B of the curved section 11 or the back surface 12B of the skirt section 12. For example, in FIG. 11C, the light-shielding plates 15A are respectively provided on the front surface and the back surface of the dome cover 10 for a camera. In this way, by providing the light-shielding plates 15A on the front surface and the back surface of the dome cover 10 for a camera, even in a case where there is an error at sticking positions of the light-shielding plates 15A, the light that crosses the boundary surface 13 can be accurately prevented. In addition, the sticking of the light-shielding plates 15A to the dome cover 10 for a camera can be performed by well-known techniques.

In FIG. 1D, the light-shielding plate 15A is disposed in the entire region of the boundary surface 13 between the curved section 11 and the skirt section 12. Accordingly, the light-shielding plate 15A can efficiently shield the light that crosses the boundary surface 13. That is, as illustrated in FIG. 11D, the light-shielding part plate 15A can shield the light that is incident from the skirt section 12 and is emitted from the curved section 11 and the light that is incident from the curved section 11 and is emitted the skirt section 12.

A case where an air part 15B is provided as the light-shielding part 15 is illustrated in FIG. 11E. The air part 15B functions as the light-shielding part 15 by reflecting a light ray. As the shape of the air part 15B, it is possible to adopt various shapes, and it is possible to adopt a shape that reflects at least a portion of the light that crosses the boundary surface 13.

A case where an irregular reflection part 15C is provided as the light-shielding part 15 is illustrated in FIG. 11F. The irregular reflection part 15C functions as the light-shielding part 15 by irregularly reflecting a light ray. For example, the irregular reflection part 15C includes a plurality of particles and can irregularly reflect the light that crosses the boundary surface 13 with the plurality of particles.

Figure 12A:
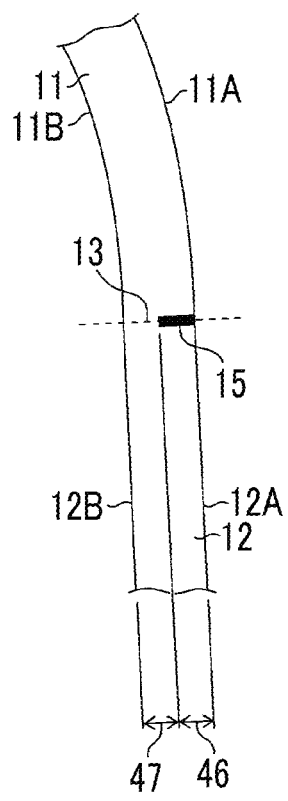
FIGS. 12A to 12C are enlarged views in the vicinity of the boundary surface.
Figure 12B:
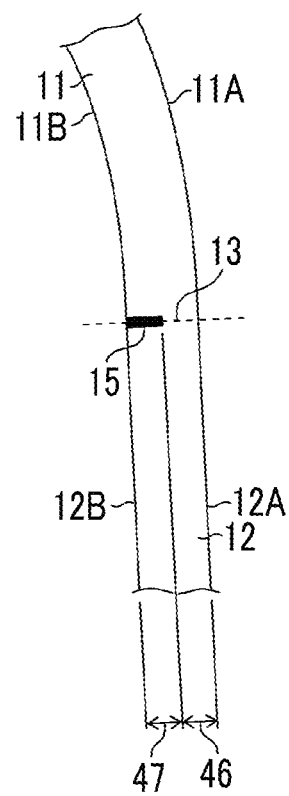
Figure 12C:
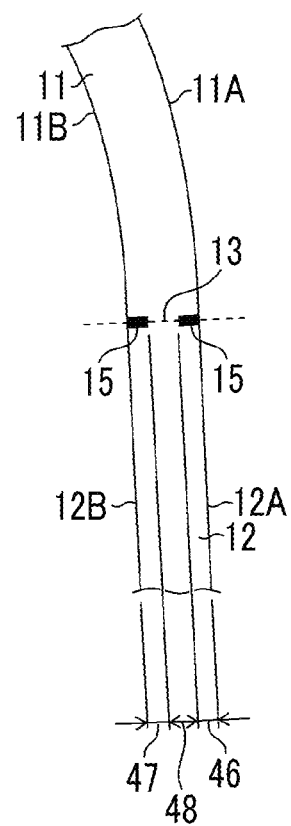

FIGS. 12A to 12C are enlarged views in the vicinity of the boundary surface 13, and illustrates an example in which the light-shielding part 15 is disposed in a portion of the boundary surface 13 between the curved section 11 and the skirt section 12 and the curved section 11 has a portion that is continuous with the skirt section 12 via the boundary surface.

In this way, since the curved section 11 is disposed in a portion of the boundary surface 13 with the skirt section 12, the light that crosses the boundary surface 13 can be shielded, and since the curved section 11 has a portion that is continuous with the skirt section 12 via the boundary surface 13, integral molding of the dome cover 10 for a camera is performed better.

In FIG. 12A, the light-shielding part 15 is provided on a front surface side 46 of the dome cover 10 for a camera on the boundary surface 13. In this way, by providing the light-shielding part 15 on the front surface side 46 of the dome cover 10 for a camera, the light that crosses the front surface side 46 of the boundary surface 13 can be shielded. Additionally, since the dome cover 10 for a camera has a portion where the curved section 11 and the skirt section 12 are continuous via the boundary surface 13, on a back surface side 47 of the boundary surface 13, integral molding is performed better.

In FIG. 12B, the light-shielding part 15 is provided on the back surface side 47 of the dome cover 10 for a camera on the boundary surface 13. In this way, by providing the light-shielding part 15 on the back surface side 47 of the dome cover 10 for a camera, the light that crosses the back surface side 47 of the boundary surface 13 can be shielded. Additionally, since the dome cover 10 for a camera has a portion where the curved section 11 and the skirt section 12 are continuous via the boundary surface 13, on the front surface side 46 of the boundary surface 13, integral molding is performed better.

In FIG. 12C, the light-shielding part 15 is provided on the front surface side 46 and the back surface side 47 of the dome cover 10 for a camera on the boundary surface 13, and the curved section 11 and the skirt section 12 are continuous via the boundary surface 13 at a central part 48 of the boundary surface 13. In this way, in a case where the light-shielding part 15 is provided on the front surface side 46 and the back surface side 47 of the dome cover 10 for a camera on the boundary surface 13, and the curved section 11 and the skirt section 12 are continuous via the boundary surface 13 at the central part 48 of the boundary surface, shielding of the light-shielding part 15 is efficiently performed, and integral molding is also performed better. In addition, the front surface side 46 of the boundary surface 13, the back surface side 47 of the boundary surface 13, and the central part 48 of the boundary surface 13 are not limited particularly. For example, a width equivalent to 50% of the thickness of the dome cover 10 for a camera may be used as the front surface side 46 of the boundary surface 13, and the back surface side 47 of the boundary surface 13 may have a width equivalent to 50% of the thickness of the dome cover 10 for a camera, as the back surface side 47 of the boundary surface 13. Additionally, a width equivalent to 60% of the thickness of the dome cover 10 for a camera is used as the central part 48 of the boundary surface 13, a width equivalent to 20% of the thickness of the dome cover 10 for a camera is used as the front surface side 46 of the boundary surface 13, and the back surface side 47 of the boundary surface 13 may have a width equivalent to 20% of the thickness of the dome cover 10 for a camera as the back surface side 47 of the boundary surface 13.

FIGS. 13A to 13D are longitudinal sectional views of the dome cover 10 for a camera in the vicinity of the boundary surface 13. A light-shielding part 15-1 (first light-shielding part) having a light-shielding surface parallel to the boundary surface 13, and a light-shielding part 15-2 (second light-shielding part) having a light-shielding surface perpendicular to the boundary surface 13 are illustrated in FIGS. 13A to 13D. In addition, the first light-shielding part 15-1 is disposed on the boundary surface 13 between the curved section 11 and the skirt section 12 and the second light-shielding part 15-2 is provided on the front surface or the back surface of the dome cover 10 for a camera. In this way, by providing the first light-shielding part 15-1 and the second light-shielding part 15-2, the light that crosses the boundary surface 13 can be accurately shielded, and integral molding of the dome cover 10 for a camera can be performed better.

For example, in FIG. 13A, the first light-shielding part 15-1 is provided on the front surface side 46 of the dome cover 10 for a camera, and the second light-shielding part 15-2 is provided on the back surface (the back surface 11B of the curved section 11, and the back surface 12B of the skirt section 12) of the dome cover 10 for a camera. Additionally, in FIG. 13B, the first light-shielding part 15-1 is provided on the back surface side 47 of the dome cover 10 for a camera, and the second light-shielding part 15-2 is provided on the front surface (the front surface 11A of the curved section 11 and the front surface 12A of the skirt section 12) of the dome cover 10 for a camera.

It is illustrated in FIG. 13C and FIG. 13D that the second light-shielding part 15-2 in FIG. 13A and FIG. 13B is embedded inside the dome cover 10 for a camera. In this way, even in a case where the second light-shielding part 15-2 is embedded inside the dome cover 10 for a camera, the light that crosses the boundary surface 13 can be accurately shielded. Additionally, integral molding is performed on the dome cover 10 for a camera by insert molding or multicolor molding.

Next, a position where the light-shielding part 15 in the dome cover 10 for a camera is provided will be described.

FIGS. 14A to 14C are views illustrating a longitudinal section of the dome cover 10 for a camera in the vicinity of the boundary surface 13, and illustrates specific examples of the position where the light-shielding part 52 is provided. A main light ray 54 passes through a central point 53 of the boundary surface 13 between the curved section 11 and the skirt section 12 of the dome cover 10 for a camera in a case where it is assumed that the light-shielding part 15 is not present. Here, the optical system 33 (imaging optical system) (refer to FIG. 3) of the imaging unit 21 has the main light ray 54. Additionally, the central point 53 of the boundary surface 13 is a point that is located on the boundary surface 13 at an equal distance from the front surface and the back surface of the dome cover 10 for a camera.

In FIG. 14A, the light-shielding part 15 is installed on the back surface (the back surface 11B of the curved section 11 and the back surface 12B of the skirt section 12) of the dome cover 10 for a camera. Additionally, in FIG. 14B, the light-shielding part 15 is installed on the front surface (the front surface 11A of the curved section 11 and the front surface 12A of the skirt section 12) of the dome cover 10 for a camera. Additionally, a central point 52 of the light-shielding part 15 illustrated in FIG. 14A and FIG. 14B is on the main light ray 54. The light-shielding part 15 disposed in this way can more effectively shield the light that crosses the boundary surface 13.

Additionally, in a case illustrated in FIG. 14C, the central point 52 of the longitudinal section of the light-shielding part 15 is located on the same plane as the boundary surface 13 between the curved section 11 and the skirt section 12. Accordingly, the light-shielding part 15 can effectively shield the light that crosses the boundary surface 13. Here, the central point 52 of the longitudinal section of the light-shielding part 15 refers to a position where the distances from both ends of the light-shielding part 15 in a longitudinal section direction are equal to each other in the longitudinal section of the light-shielding part 15. In addition, the longitudinal section direction in the description of the present application refers to a direction perpendicular to a plane including an opening end of the dome cover 10 for a camera.

Next, the size of the light-shielding part 15 provided in the dome cover 10 for a camera will be described.

Figure 15:
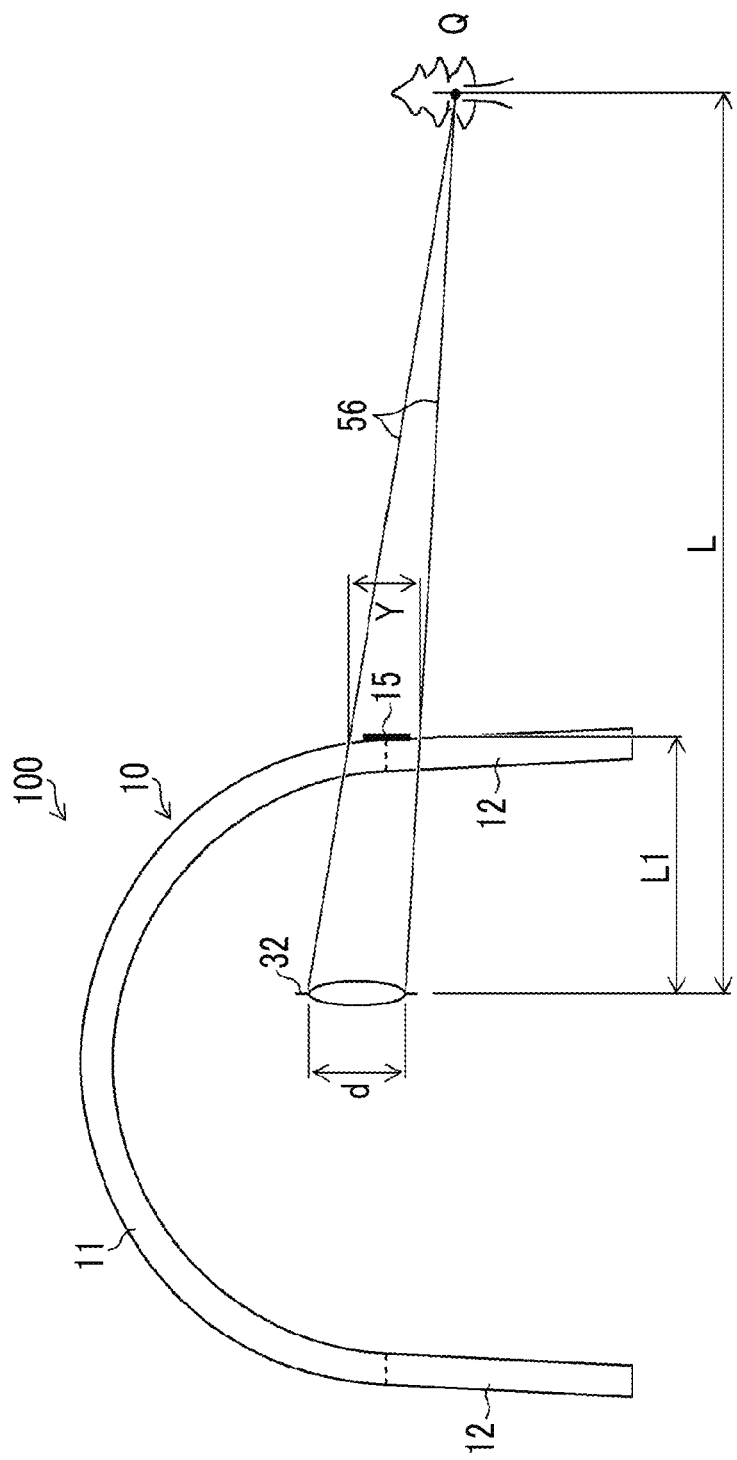
FIG. 15 is a longitudinal sectional view of the camera with a cover.

FIG. 15 is a longitudinal sectional view of the camera 100 with a cover, illustrating a subject Q in the captured image 50. In addition, only the stop 32 of the camera device 25 will be described and other parts are omitted.

A height Y (hereinafter described as a beam height Y) of a beam of a longitudinal section of a dome cover passage region is expressed by the following equation.

$$Y = d \times (L - L1)/L$$

Where, as illustrated in FIG. 15, d represents the stop diameter of the camera device 25, L represents a distance from the stop 32 of the camera device 25 to the subject Q, and L1 represents a distance from the stop 32 of the camera device 25 to the light-shielding part 15. In addition, in the above-described equation, it is considered that there is little influence by the thickness of the dome cover 10 for a camera to the beam height Y, and the thickness of the dome cover 10 for a camera is not taken into consideration. Additionally, the height Y of the longitudinal section of the dome cover passage region is a height in the longitudinal section direction on the front surface (or back surface) of the dome cover 10 in a case where the main light ray of the optical system 33 (imaging optical system) (refer to FIG. 3) of the imaging unit 21 passes through the central point 53 on the boundary surface 13 and the beam of the main light ray passes through the dome cover 10.

Figures 16, 17:
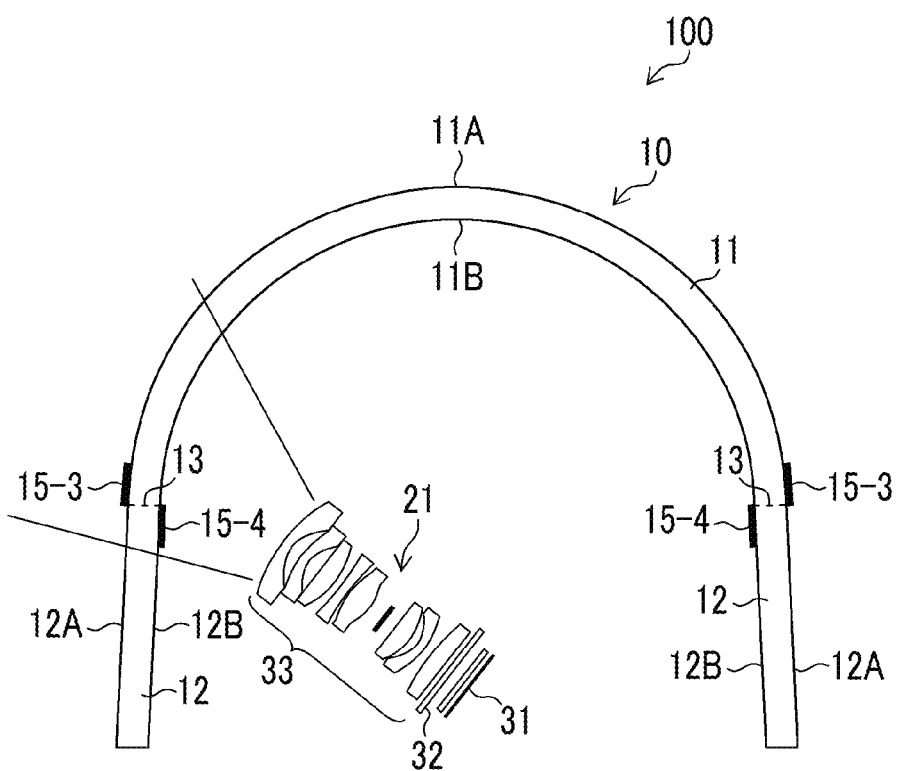
FIG. 16 is a view illustrating the height of a longitudinal section of a light-shielding part, the evaluation of the quantity of light, and the evaluation of blurring.
FIG. 17 is a longitudinal sectional view of the camera with a cover.

FIG. 16 is a view illustrating the height of the longitudinal section of the light-shielding part 15, the evaluation of the quantity of light, and the evaluation of blurring. The height of the longitudinal section of the light-shielding part 15 is shown in percentage (%) with reference to the beam height Y expressed by the above-described equation. Additionally, in the evaluation of the quantity of light and the evaluation of blurring in FIG. 16, acquired captured images are visually determined and evaluated. Here, the height of the longitudinal section of the light-shielding part 15 refers to a distance between both ends of the longitudinal section direction of the light-shielding part 15 in the longitudinal section of the light-shielding part 15.

In a case where the light-shielding part 15 is not provided (in a case where the height of the longitudinal section of the light-shielding part 15 is 0%), in a captured image, there is no reduction in the quantity of light and the evaluation is "very good". However, blurring occurs and the evaluation becomes "bad". On the other hand, in a case where the height of the longitudinal section of the light-shielding part 15 is 100%, a portion that becomes black in a certain region of a captured image is generated. The evaluation is "not good".

In a case where the height of the longitudinal section of the light-shielding part 15 is 20%, the evaluation is "good" because this height is recognized to such a degree that a decline in the quantity of light is not noticed, and the evaluation is "normal" because there is also a blurring suppression effect. Additionally, also in a case where the height of the longitudinal section of the light-shielding part 15 is 40%, similarly, the evaluation is "good" because this height is recognized to such a degree that a decline in the quantity of light is not noticed more, and the evaluation is "normal" because there is also a more blurring suppression effect.

In a case where the height of the longitudinal section of the light-shielding part 15 is 80%, the evaluation is "normal" because a region that becomes dark in a captured image is generated, but the image is recognizable, and the evaluation is "good" because the blurring suppression effect is large. In a case where the height of the longitudinal section of the light-shielding part 15 is 60%, the evaluation is "normal" because a region that becomes dark in a captured image is generated, but the image is more recognizable, and the evaluation is "good" because the blurring suppression effect is large.

Based on the evaluation illustrated in FIG. 17, it is preferable that the height of the longitudinal section of the light-shielding part 15 is 20% or more and 80% or less of the beam height Y. Additionally, the height of the longitudinal section of the light-shielding part 15 is more preferably 40% or more and 60% or less of the height Y.

Next, a modification example regarding the position of the camera device 25 in the dome cover 10 for a camera will be described.

FIG. 17 is a longitudinal sectional view of the camera 100 with a cover. In addition, the portions that have been already described in FIG. 3 will be designated by the same reference signs, and the description thereof will be omitted. In the camera 100 with a cover illustrated in FIG. 17, the camera device 25 (imaging unit 21) is provided in a space surrounded by a plane including the boundary surface 13 between the curved section 11 and the skirt section 12 and the back surface 12B of the skirt section 12.

In a case where the camera device 25 is provided below the boundary surface 13, the light that is received by the imaging unit 21 and crosses the boundary surface 13 is light that is incident from the front surface 11A of the curved section 11 and is emitted from the back surface 12B of the skirt section 12. Hence, by providing two light-shielding parts 15 (a first light-shielding part and a second light-shielding part), providing the first light-shielding part 15-3 on the front surface 11A of the curved section 11, and providing the second light-shielding part 15-4 on the back surface 12B of the skirt section 12, the light that crosses the boundary surface 13 can be effectively shielded.

Figure 18:
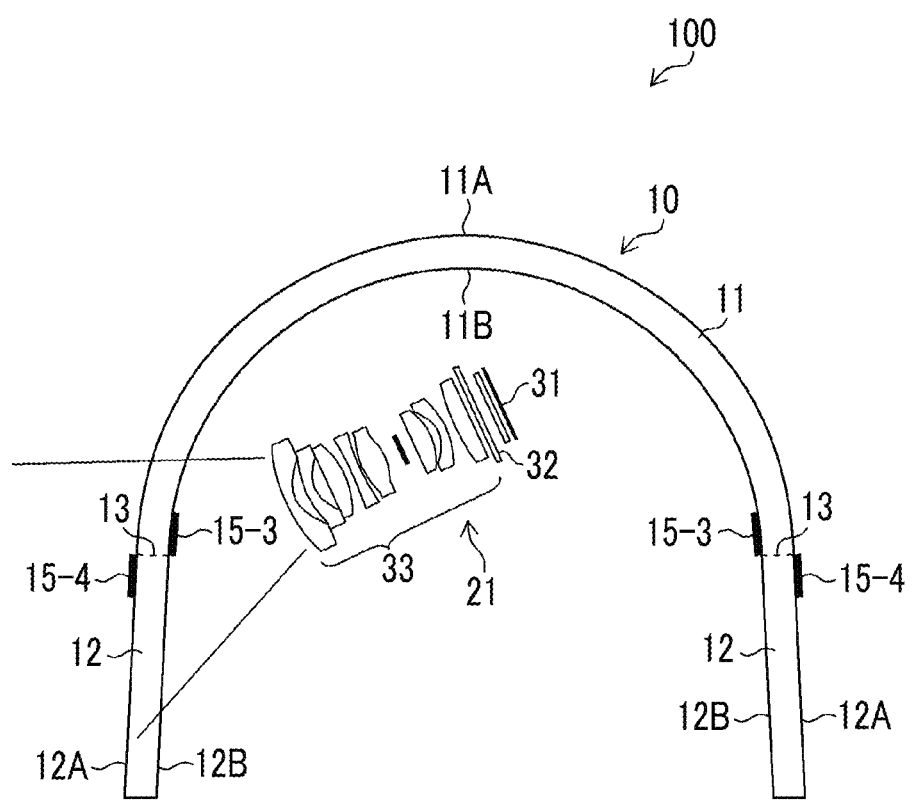
FIG. 18 is a longitudinal sectional view of the camera with a cover.

FIG. 18 is a longitudinal sectional view of the camera 100 with a cover. In addition, the portions that have been already described in FIG. 3 will be designated by the same reference signs, and the description thereof will be omitted. In the camera 100 with a cover illustrated in FIG. 18, the camera device 25 (imaging unit 21) is provided in a space surrounded by a plane including the boundary surface 13 between the curved section 11 and the skirt section 12 and the back surface 11B of the curved section 11.

In a case where the camera device 25 is provided above the boundary surface 13, the light that is received by the imaging unit 21 and crosses the boundary surface 13 is light that is incident from the front surface 12A of the skirt section 12 and is emitted from the back surface 11B of the curved section 11. Hence, by providing the two light-shielding parts 15 (the first light-shielding part and the second light-shielding part), providing the first light-shielding part 15-3 on the back surface 11B of the curved section 11, and providing the second light-shielding part 15-4 on the front surface 12A of the skirt section 12, the light that crosses the boundary surface 13 can be effectively shielded.

Although the example of the invention has been described above, it is obvious that the invention is not limited to the above-described embodiment, and various modifications can be made without departing from the spirit of the invention.

EXPLANATION OF REFERENCES

10: dome cover for camera
11: curved section
11A: front surface of curved section
11B: back surface of curved section
12: skirt section
12A: front surface of skirt section
12B: back surface of skirt section
13: boundary surface
15: light-shielding part
21: imaging unit
23: pedestal
25: camera device
31: imaging element
32: stop
33: optical system
50: captured image
51: blurring region
100: camera with a cover

What is claimed is:

1. A dome cover for a camera comprising:
a curved section of which a front surface and a back surface have a spherical shape;
a skirt section of which a front surface and a back surface have a cylinder shape; and
a light-shielding part that shields a part or whole of at least one of light that is incident from the skirt section and is emitted from the curved section or light that is incident from the curved section and is emitted from the skirt section,
wherein the curved section and the skirt section are integrally molded,
wherein the light-shielding part includes a first light-shielding part and a second light-shielding part that is separate from the first light-shielding part,
wherein the first light-shielding part is embedded between the curved section and the skirt section along a portion of a boundary surface between the curved section and the skirt section, the portion being on the back surface side of the curved section and the skirt section, and
wherein the second light-shielding part is disposed in contact with both the front surface of the curved section and the front surface of the skirt section.

2. The dome cover for a camera according to claim 1, wherein a central point of a longitudinal section of the second light-shielding part is located on a same plane as the boundary surface between the curved section and the skirt section.

3. The dome cover for a camera according to claim 1, wherein at least one of the first light-shielding part and the second light-shielding part is a light-shielding plate.

4. The dome cover for a camera according to claim 1, wherein the second light-shielding part is disposed on the front surface of the curved section and the front surface of the skirt section.

5. The dome cover for a camera according to claim 1, wherein the second light-shielding part is embedded in the front surface of the curved section and the front surface of the skirt section.

6. The dome cover for a camera according to claim 1, wherein the first light-shielding part is parallel to the boundary surface, and the second light-shielding part is perpendicular to the boundary surface.

7. A dome cover for a camera comprising:
a curved section of which a front surface and a back surface have a spherical shape;
a skirt section of which a front surface and a back surface have a cylinder shape; and
a light-shielding part that shields a part or whole of at least one of light that is incident from the skirt section and is emitted from the curved section or light that is incident from the curved section and is emitted from the skirt section,
wherein the curved section and the skirt section are integrally molded,
wherein the light-shielding part includes a first light-shielding part and a second light-shielding part that is separate from the first light-shielding part,
wherein the first light-shielding part is embedded between the curved section and the skirt section along a portion of a boundary surface between the curved section and the skirt section, the portion being on the front surface side of the curved section and the skirt section, and
wherein the second light-shielding part is disposed in contact with both the back surface of the curved section and the back surface of the skirt section.

8. The dome cover for a camera according to claim 7, wherein a central point of a longitudinal section of the second light-shielding part is located on a same plane as the boundary surface between the curved section and the skirt section.

9. The dome cover for a camera according to claim 7, wherein at least one of the first light-shielding part and the second light-shielding part is a light-shielding plate.

10. The dome cover for a camera according to claim 7, wherein the second light-shielding part is disposed on the back surface of the curved section and the back surface of the skirt section.

11. The dome cover for a camera according to claim 7, wherein the second light-shielding part is embedded in the back surface of the curved section and the back surface of the skirt section.

12. The dome cover for a camera according to claim 7, wherein the first light-shielding part is parallel to the boundary surface, and the second light-shielding part is perpendicular to the boundary surface.

* * * * *